United States Patent
Nguyen et al.

(10) Patent No.: US 7,889,714 B2
(45) Date of Patent: Feb. 15, 2011

(54) APPARATUS AND METHOD FOR TESTING VOICE SYSTEMS IN A TELECOMMUNICATION NETWORK

(75) Inventors: Nhut Nguyen, Richardson, TX (US); Matt Wu, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1043 days.

(21) Appl. No.: 10/810,302

(22) Filed: Mar. 26, 2004

(65) Prior Publication Data

US 2005/0213564 A1 Sep. 29, 2005

(51) Int. Cl.
*H04L 12/66* (2006.01)

(52) U.S. Cl. .......... 370/352; 370/251; 370/252; 370/351; 370/389; 379/9; 455/560

(58) Field of Classification Search ........ 370/352, 370/250, 251, 351, 389; 379/9; 455/560
See application file for complete search history.

(56) References Cited

U.S. PATENT DOCUMENTS

| | | | |
|---|---|---|---|
| 7,016,348 B2 * | 3/2006 | Laursen et al. | 370/389 |
| 7,161,932 B1 * | 1/2007 | Watts | 370/352 |
| 7,173,910 B2 * | 2/2007 | Goodman | 370/252 |
| 7,197,029 B1 * | 3/2007 | Osterhout et al. | 370/353 |
| 7,388,946 B1 * | 6/2008 | Mussman et al. | 379/15.01 |
| 2002/0114317 A1 * | 8/2002 | Dorenbosch et al. | 370/352 |
| 2002/0145979 A1 * | 10/2002 | Baj | 370/242 |
| 2002/0176404 A1 * | 11/2002 | Girard | 370/352 |
| 2004/0072593 A1 * | 4/2004 | Robbins et al. | 455/560 |
| 2004/0073658 A1 * | 4/2004 | Oran et al. | 709/224 |
| 2005/0213564 A1 * | 9/2005 | Nguyen et al. | 370/352 |
| 2007/0127391 A1 * | 6/2007 | Goodman | 370/252 |

OTHER PUBLICATIONS

Zhang, Yuan, SIP-based VOIP network and its interworking with the PSTN, Electronics & Communication Engineering Journal, Dec. 2002, pp. 273-282.*

Dutta, A., et al, Implementing a Testbed for Mobile Multimedia, IEEE 2001, pp. 1944-1949.*

Williams, Steve, The softswitch advantage, IEE Review, Jul. 2002.*

* cited by examiner

*Primary Examiner*—Ricky Ngo
*Assistant Examiner*—Luat Phung

(57) ABSTRACT

A test controller for use in a telecommunication system is provided for inexpensively and quickly testing a telecommunication device. The test controller receives a test call from an originating terminal and allocates a voice path within the telecommunication device for the test call to establish a call connection for the test call between the originating terminal and a destination terminal via the allocated voice path and a packet-switched network.

16 Claims, 3 Drawing Sheets

APPARATUS AND METHOD FOR TESTING VOICE SYSTEMS IN A TELECOMMUNICATION NETWORK

TECHNICAL FIELD OF THE INVENTION

The present invention is directed generally to testing systems and, more specifically, to a method for testing voice paths in a telecommunications device.

BACKGROUND OF THE INVENTION

Verifying the functionality of voice communication systems is an essential task during the development phase and during subsequent testing of voice systems. Functionality of voice communication systems is realized by information processing for two parts of the system: signaling and voice transportation. A traditional method to verify functionality of a voice system is to use a software simulator that generates signaling messages and sends the messages to the system under test. The signaling messages cause the system to react and generate observable information that can be used to verify the information processing of signaling information of the system. However, traditional simulator methods are not able to verify the voice transportation functionality of the system under test, i.e. whether or not the voice information is communicated correctly.

Another traditional method to verify the functionality of a voice system is to use real equipment that triggers processing of both the signaling and the voice transportation of the system under test in order to verify the information processing for both the signaling information and the voice path. However, verifying the voice path often necessitates the acquisition and use of expensive equipment that may not be part of the system under verification. In many instances, the acquired equipment also must be properly set-up, which requires significant effort and is a time consuming process.

For instance, during the development of a mobile switching center for wireless networks, a Base Station Controller (BSC), a Base Transceiver Station (BTS) and mobile stations are usually needed, even though they are not under verification. The costs associated with this equipment, as well as the time and effort required to acquire and setup the equipment, increases the verification time and the expense of the verification process.

Therefore, there is a need in the art for an improved voice system verification method that eliminates the need for additional equipment that are not under test. In particular, there is a need for an inexpensive, simple, flexible and easily configured verification system and method that is capable of improving developer's productivity and reducing the time to market of voice communication systems.

SUMMARY OF THE INVENTION

The present invention proposes a combination of simulation software and inexpensive voice transportation equipment to allow for verification of both signaling and voice transportation functionality of a voice communication system. In particular, the present invention uses Internet Protocol (IP) based terminals to verify the voice transportation of the voice communication system under test, and a software simulator to trigger the necessary signaling processing that is required for the voice transportation.

To address the above-discussed deficiencies of the prior art, it is a primary object of the present invention to provide, for use in a telecommunication network, an apparatus capable of testing both signaling and voice functionality in a telecommunication device. According to one embodiment of the present invention, the apparatus includes a test controller connected to the telecommunication device that is capable of receiving a test call from an originating terminal. The test controller is further capable of allocating a voice path for the test call to establish a call connection for the test call between the originating terminal and a destination terminal via the allocated voice path and a packet-switched network.

According to another embodiment of the present invention, the telecommunication device is provided with switching fabric including a plurality of voice circuits for switching voice calls, and a controller capable of receiving a signaling message from the test controller to establish the call connection for the test call through one of the voice circuits and the packet-switched network.

According to still another embodiment of the present invention, a media gateway is connected to the telecommunication device and the packet-switched network to convert between circuit-switched voice transmitted by the telecommunication device and packet-switched voice transmitted over the packet-switched network.

According to yet another embodiment of the present invention, the originating terminal and the destination terminal are Session Initiation Protocol (SIP) terminals.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
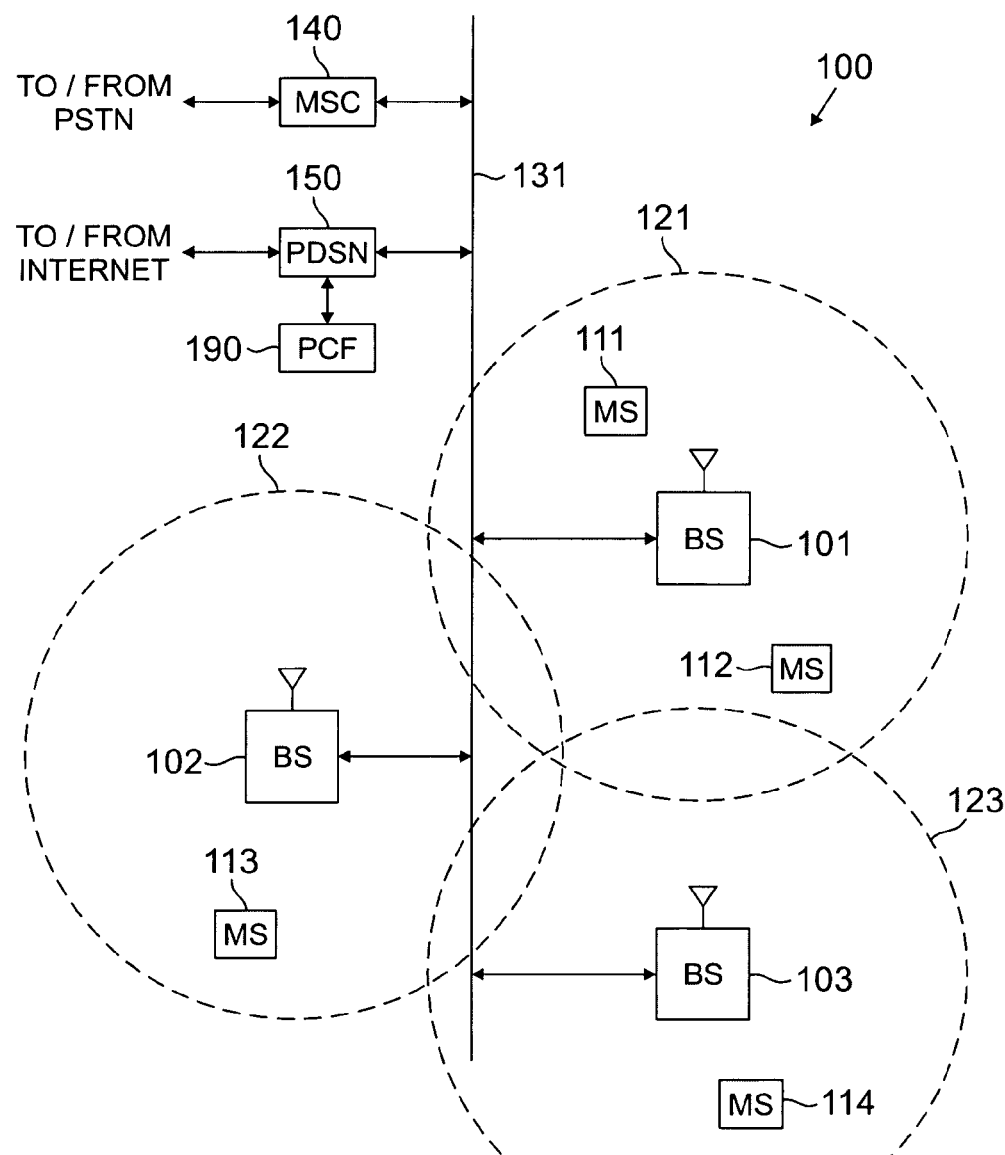
FIG. 1 illustrates an exemplary wireless network that contains numerous telecommunication devices having voice circuitry suitable for testing according to the principles of the present invention.
Figure 2:
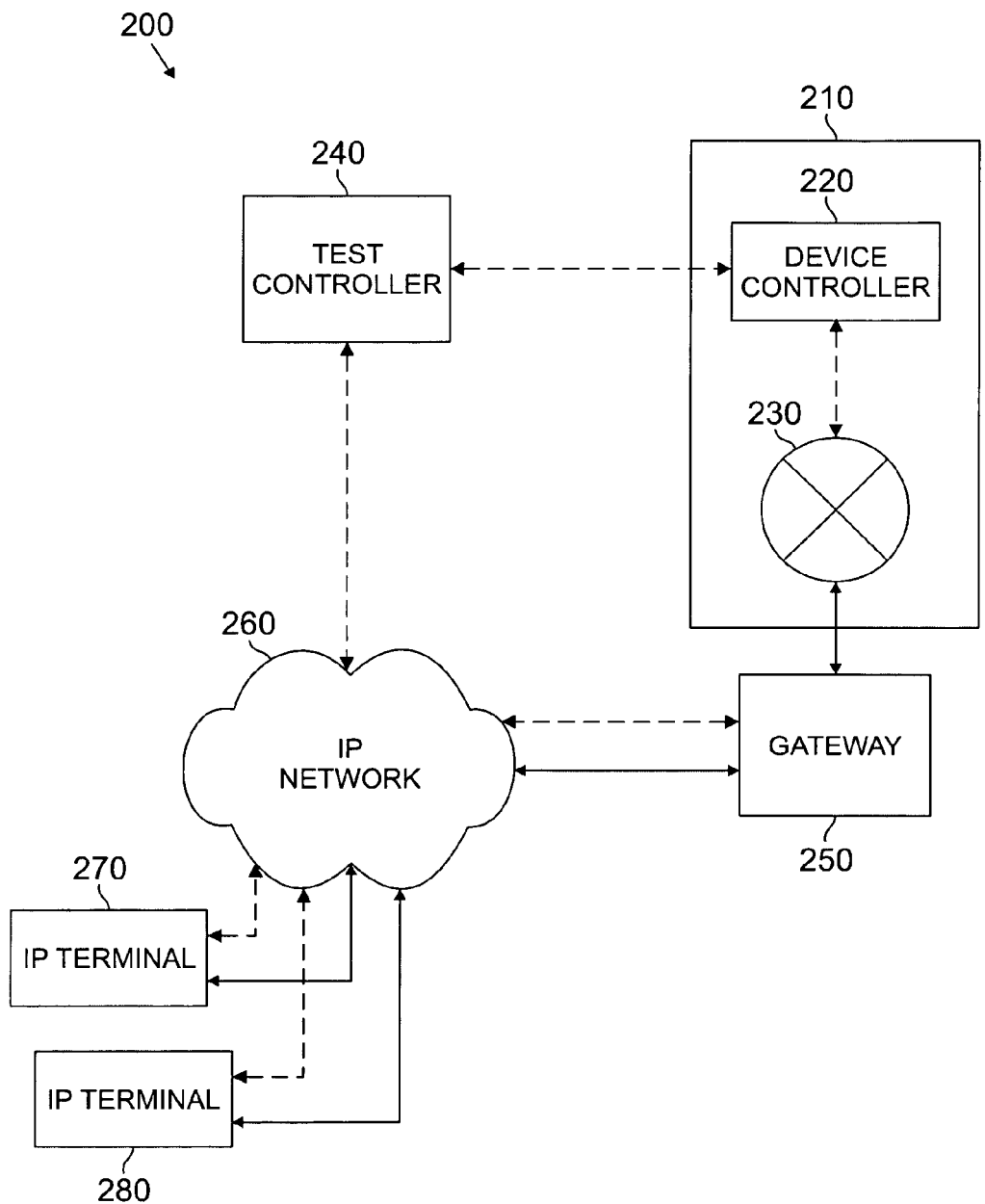
FIG. 2 illustrates an exemplary test system according to one embodiment of the present invention.
Figure 3:
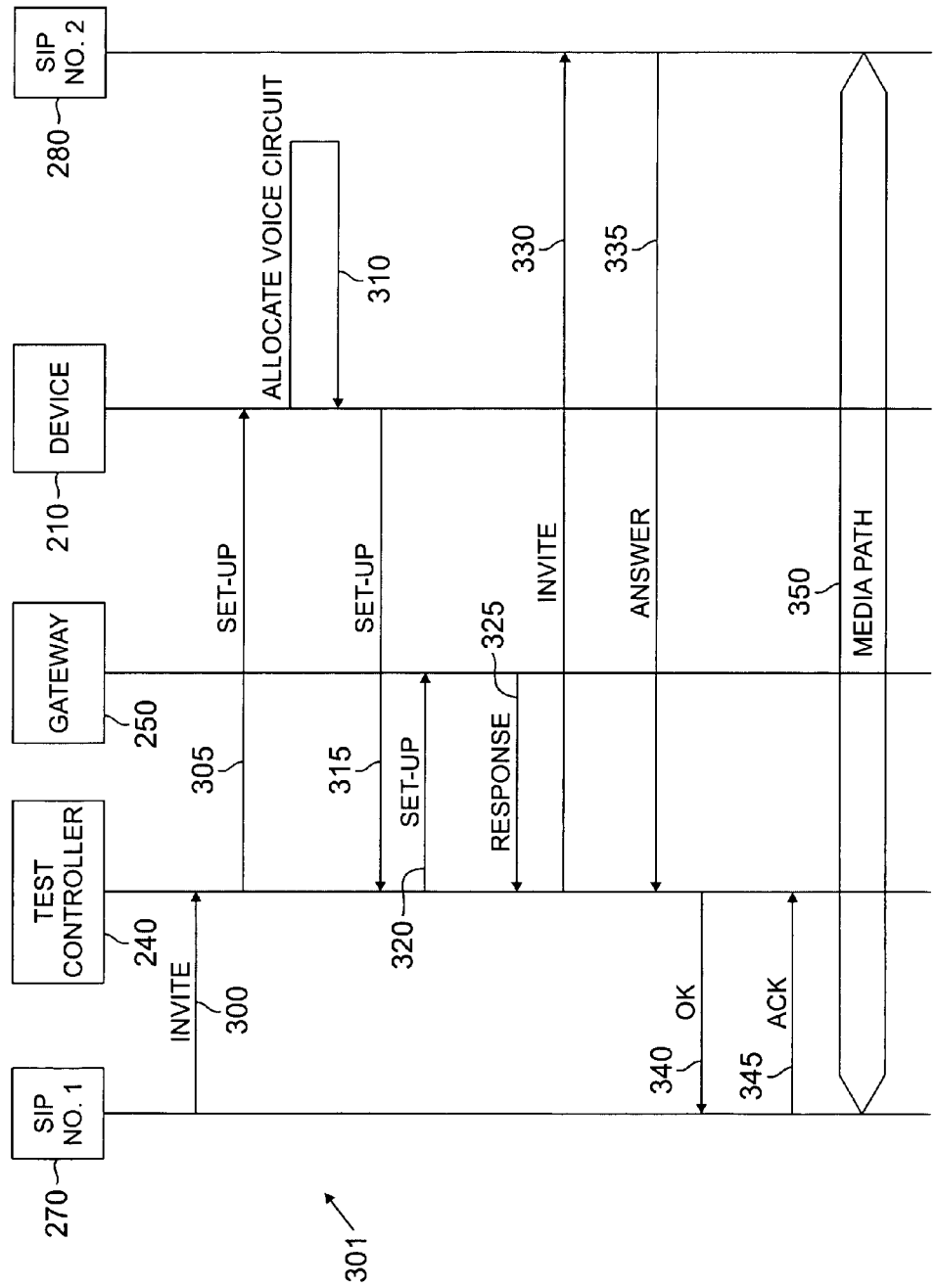
FIG. 3 is a signaling diagram illustrating the operation of the exemplary test system in FIG. 2 according to an exemplary embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged test system.

FIG. 1 illustrates exemplary wireless network 100, which comprises numerous telecommunication devices having voice circuitry suitable for testing according to the principles of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over an air interface. Mobile stations 111-114 may be any suitable wireless devices, including conventional cellular radiotelephones, PCS handset devices, personal digital assistants, portable computers, telemetry devices, and the like, which are capable of communicating with the base stations via wireless links.

The present invention is not limited to mobile devices. Other types of wireless or wireline access terminals, including fixed wireless terminals, may be used. For the sake of simplicity, only mobile stations are shown and discussed hereafter. However, it should be understood that the use of the term "mobile station" in the description below is intended to encompass both truly mobile devices (e.g., cell phones, wireless laptops) and stationary wireless terminals (e.g., monitoring devices with wireless capability).

Dotted lines show the approximate boundaries of the cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

In one embodiment of the present invention, BS 101, BS 102, and BS 103 comprise a base station controller (BSC) and at least one base transceiver subsystem (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystem in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of base stations 101-103, or as a stand-alone device that communicates with PDSN 150, as shown in FIG. 1. Line 131 also provides the connection path to transfer control signals between MSC 140 and BS 101, BS 102 and BS 103 used to establish connections for voice and data circuits between MSC 140 and BS 101, BS 102 and BS 103.

Communication line 131 may be any suitable connection means, including a T1 line, a T3 line, a fiber optic link, or any other type of data connection. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102 or BS 103 to MSC 140. Verifying voice paths established by the MSC 140 without expensive BSC and BTS equipment, for instance, is one exemplary application of the present invention.

FIG. 2 illustrates exemplary test system 200 according to one embodiment of the present invention. Test system 200 comprises telecommunication device 210 having one or more voice paths suitable for testing. Telecommunication device 210 can be, for example, a mobile switching center, described previously in connection with FIG. 1. In other embodiments, telecommunication device 210 can be a Public Switched Telephone Network (PSTN) switch, Asynchronous Transfer Mode (ATM) switch, Private Branch Exchange (PBX), Signaling System #7 (SS7) switch or any other telecommunication device including voice paths.

Telecommunication device 210 comprises device controller 220 and switching fabric 230. Switching fabric 230 includes one or more voice paths, realized by any medium capable of carrying voice. By way of example, but not limitation, switching fabric 230 can include one or more Time Division Multiplexed (TDM) switched voice circuits. Switching fabric 230 allocates a voice path between two communication parties for a call under control of device controller 220. Device controller 220 provides a signaling path (indicated by the dotted line) to switching fabric 230 to control the allocation and connection of voice paths for a call. The functionality of telecommunication device 200 to be tested includes the information processing of the signaling path by controller 220 and the voice path connections made by switching fabric 230.

The testing of telecommunication device 210 is performed by test controller 240. Test controller 240 includes a software simulator that coordinates the verification of both the voice and signaling functionality of telecommunication device 210. Test controller 240 has a signaling connection to telecommunication device 210 to send and receive signaling messages to and from telecommunication device 210 over a signaling path (indicated by the dotted line). For example, test controller 240 is configured to send a signaling message to device controller 220 within telecommunication device 210 that instructs device controller 220 to set-up a test call using one or more voice paths within switching fabric 230. As another example, test controller 240 is configured to receive a signaling message from device controller 220 within telecommunication device 210 indicating whether the attempted call set-up failed or succeeded. Thus, test controller 240 simulates the interface to telecommunication device 210 using the appropriate protocol for telecommunication device 210.

To test the functionality of telecommunication device 210, two Internet Protocol (IP) terminals 270 and 280 are used in place of expensive equipment, such as BTS, BSC and mobile stations of a mobile voice communication system. In an exemplary embodiment, IP terminals 270 and 280 are Session Initiation Protocol (SIP) phones. SIP is a signaling protocol for managing and terminating voice and video sessions across packet networks, such as IP network 260. IP network 260 can be, for example, a local area network (LAN). As used herein, the term "SIP" refers to the standard published in the Internet Engineering Task Force (IETF) RFC 3261, June 2002, or later version.

One of the IP terminals, for example, IP terminal 270 places a test call to test controller 240. IP terminal 270 generates a signaling message to an IP address of test controller 240 and sends the signaling message to test controller 240 via IP network 260 to set-up the test call. Test controller 240 receives the signaling message from IP terminal 270 and generates signaling messages simulating the protocol used by telecommunication device 210. As an effect of processing received signaling message, device controller 220 allocates a particular voice path within switching fabric 230 for the test call. This voice path is the subject of testing. Switching fabric 230 is configured to have both ends of the voice path interconnected to two different ports of Gateway 250. Once the voice path is allocated in telecommunication device 210, device controller 220 sends a signaling message to test controller 240 to connect the call. Test controller 240 receives the signaling message from device controller 220 and generates a signaling message to the IP address of IP terminal 280 to cause the ringing of IP terminal 280 via IP network 260.

Test controller 240 further has a signaling connection to Gateway 250. Test controller 240 generates a signaling message to Gateway 250 to complete the voice path between IP terminals 270 and 280 via the internal connection made by switching fabric 230 of telecommunication device 210, so that voice functionality can be verified. Gateway 250 is connected to switching fabric 230 within telecommunication device 210 and to IP network 260. Gateway 250 converts the voice information carried by IP network 260 into the format required by telecommunication device 210. For example, Gateway 250 can convert between packet-switched voice carried by the IP network 260 and circuit-switched voice carried by telecommunication device 210. In another embodiment of the present invention, switching fabric 230 of telecommunication device 210 can be a voice gateway. In this embodiment, there is not a need for a separate Gateway 250.

Voice information is carried between IP terminals 270 and 280 via IP network 260, Gateway 250 and the voice path under test within telecommunication device 210. Verification of the functionality of the allocated voice path is performed by analyzing the voice information received at IP terminals 270 and 280. The verification process can be repeated to test each voice path within switching fabric 230.

FIG. 3 depicts signaling diagram 301, which illustrates the operation of exemplary test system 200 according to an exemplary embodiment of the present invention using SIP phones. To initiate the test call, SIP #1 phone 270 generates a SIP INVITE message 300 to the IP address of test controller 240. INVITE message 300 invites test controller to a SIP session with SIP #1 phone 270. Upon receiving INVITE message 300, test controller determines the IP address of SIP #2 phone (e.g., by querying SIP #1 phone) and generates a call set-up message 305 to telecommunication device 210 in the protocol used by telecommunication device 210. This call set-up message 305 triggers the signaling processing function of telecommunication device 210 and may be followed by a set of signaling messages between test controller 240 and telecommunication device 210, simulating the protocol that telecommunication device 210 uses. As a result of this signaling message transaction, telecommunication device 210 allocates a particular voice circuit 310 for the test call.

Once the voice circuit has been allocated for the test call, telecommunication device 210 exchanges signaling messages with test controller 240 according to its protocol. At the end of this transaction, a signaling message is sent to connect the call to the other end. This message is illustrates as call set-up message 315 in FIG. 3. Test controller 240 intercepts call set-up message 315 and transmits a call set-up message 320 to Gateway 250 to complete the voice path for the test call. Gateway 250 transmits a response message 325 to test controller indicating the voice path is complete, and in response thereto, test controller 240 generates an INVITE message 330 to SIP #2 phone 280 to ring SIP #2 phone 280. When the call is answered 335 at SIP #2 phone 280, test controller 240 sends a response message 340 to SIP #1 phone 270 indicating the call was answered. SIP #1 phone 270 sends an acknowledgement (ACK) message 345 to test controller 240 confirming the response message 340 was received. Thereafter, a media path 350 is established between SIP #1 phone 270 and SIP #2 phone 280 via Gateway 250 and the allocated voice circuit 310 in telecommunication device 210 to test the voice path between SIP #1 phone 270 and SIP #2 phone 280. With this testing process, information processing of both the signaling path and the voice path (i.e. the allocated voice circuit 310) can be verified without requiring expensive voice equipment.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a telecommunication network, an apparatus for testing a telecommunication device comprising switching fabric including a plurality of voice paths, said apparatus comprising:

a test controller configured to receive a test call initiation message directed to the test controller from an originating terminal, to prompt the telecommunication device to allocate one of the voice paths within the telecommunication device for a test call based on the test call initiation message, and to establish a call connection for the test call between the originating terminal and a destination terminal via the allocated voice path and a packet-switched network to test the allocated voice path;

wherein the test controller comprises a simulator configured to verify a connection to the originating terminal through a signaling connection between the test controller and the originating terminal, wherein the connection is verified by simulating a connection to the originating terminal using a test call comprising at least one voice path within the switching fabric, and wherein the originating terminal and the destination terminal are Session Initiation Protocol (SIP) phones, and the test call initiation message is an INVITE message addressed to an Internet Protocol (IP) address of said test controller.

2. The apparatus as set forth in claim 1 wherein the voice paths comprise time division multiplexed (TDM) switched circuits.

3. The apparatus as set forth in claim 1 wherein said test controller is configured to send a signaling message to an IP address of the destination terminal.

4. The apparatus as set forth in claim 1 wherein said test controller is configured to send a signaling message to a device controller within said telecommunication device, said device controller allocating the allocated voice path.

5. The apparatus as set forth in claim 1 wherein the allocated voice path provides a connection to a media gateway for converting between circuit-switched voice and packet-switched voice.

6. A telecommunication system for testing a telecommunication device comprising switching fabric including a plurality of voice paths, said telecommunication system comprising:
- an originating terminal configured to generate a test call initiation message; and
- a test controller configured to receive the test call initiation message from the originating terminal, the test call initiation message being directed to the test controller, to prompt the telecommunication device to allocate one of the voice paths within the telecommunication device for a test call based on the test call initiation message, and to establish a call connection for the test call between the originating terminal and a destination terminal via the allocated voice path and a packet-switched network to test the allocated voice path;
- wherein the test controller comprises a simulator configured to verify a connection to the originating terminal through a signaling connection between the test controller and the originating terminal, wherein the connection is verified by simulating a connection to the originating terminal using a test call comprising at least one voice path within the switching fabric, and
- wherein the originating terminal and the destination terminal are Session Initiation Protocol (SIP) phones, and the test call initiation message is an INVITE message addressed to an Internet Protocol (IP) address of said test controller.

7. The telecommunication system as set forth in claim 6 wherein the voice paths comprise time division multiplexed (TDM) switched circuits.

8. The telecommunication system as set forth in claim 6, further comprising:
- a media gateway connected to said telecommunication device and the packet-switched network to convert between circuit-switched voice transmitted by said telecommunication device and packet-switched voice transmitted over the packet-switched network, the allocated voice path being connected to said media gateway for the test call.

9. The telecommunications system as set forth in claim 6, wherein said telecommunication device comprises:
- switching fabric including a plurality of voice circuits for switching voice calls; and
- a controller operable to receive a signaling message from said test controller to establish the call connection for the test call through the packet-switched network, said controller being further operable to allocate one of the voice circuits for the test call to test the allocated voice circuit.

10. The telecommunication system as set forth in claim 6 wherein said test controller is configured to send a signaling message to an IP address of the destination terminal.

11. The telecommunication system as set forth in claim 6 wherein said test controller is configured to send a signaling message to a device controller within said telecommunication device, said device controller allocating the allocated voice path.

12. The telecommunication system as set forth in claim 6 wherein said telecommunication device is a switch.

13. The telecommunication system as set forth in claim 12 wherein said switch is a mobile switching center.

14. For use in a telecommunication system comprising a telecommunication device, said telecommunication device comprising switching fabric including a plurality of voice paths, a method of testing the voice paths in said telecommunication device, the method comprising the steps of:
- receiving a test call initiation message directed to a test controller from an originating terminal;
- sending a signaling message to the telecommunication device to allocate one of the voice paths for a test call in the telecommunication device based on the test call initiation message;
- verifying a connection to the originating terminal through a signaling connection between the test controller and the originating terminal, wherein the connection is verified by simulating a connection to the originating terminal using a test call comprising at least one voice path within the switching fabric;
- establishing a connection between the originating terminal and a destination terminal for the test call through a packet-switched network using the allocated voice path; and
- testing the allocated voice path during the test call,
- wherein the originating terminal and the destination terminal are Session Initiation Protocol (SIP) phones, and the test call initiation message is an INVITE message addressed to an Internet Protocol (IP) address of said test controller.

15. The method as set forth in claim 14 further comprising the step of converting between circuit-switched voice transmitted by said telecommunication device and packet-switched voice transmitted over the packet-switched network.

16. The method as set forth in claim 14 wherein said establishing further comprises sending a signaling message from the test controller to an IP address of the destination terminal.

* * * * *